(12) United States Patent
Rajagopalan et al.

(10) Patent No.: US 9,739,624 B2
(45) Date of Patent: Aug. 22, 2017

(54) VEHICLE POWER MANAGEMENT UTILIZING OPERATOR SCHEDULE DATA

(71) Applicant: GM Global Technology Operations LLC, Detroit, MI (US)

(72) Inventors: Sai S. Rajagopalan, Bloomfield Hills, MI (US); Anthony L. Smith, Troy, MI (US); Nathan F. Thompson, Sterling Heights, MI (US); Xiaoyu Huang, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/977,696

(22) Filed: Dec. 22, 2015

(65) Prior Publication Data
US 2017/0176195 A1    Jun. 22, 2017

(51) Int. Cl.
*G01C 21/12*  (2006.01)
*G01C 21/34*  (2006.01)
*B60L 11/18*  (2006.01)

(52) U.S. Cl.
CPC ...... *G01C 21/3415* (2013.01); *B60L 11/1816* (2013.01); *B60L 11/1824* (2013.01); *B60L 11/1842* (2013.01); *B60L 11/1861* (2013.01); *G01C 21/343* (2013.01); *G01C 21/3469* (2013.01); *G01C 21/3492* (2013.01)

(58) Field of Classification Search
USPC ......................................................... 701/416
See application file for complete search history.

(56) References Cited

U.S. PATENT DOCUMENTS

| | | | |
|---|---|---|---|
| 8,154,246 B1* | 4/2012 | Heitmann | B60L 11/184 320/109 |
| 8,615,355 B2 | 12/2013 | Inbarajan et al. | |
| 2009/0192655 A1* | 7/2009 | Ichikawa | B60L 11/1811 700/291 |
| 2010/0094496 A1* | 4/2010 | Hershkovitz | B60L 3/12 701/22 |
| 2010/0241301 A1* | 9/2010 | Yang | B60K 6/12 701/31.4 |

(Continued)

*Primary Examiner* — Tyler Paige
(74) *Attorney, Agent, or Firm* — Mickki D. Murray, Esq.; Parks IP Law LLC

(57) ABSTRACT

An electric-vehicle power management system including a processing hardware unit and multiple modules executable by the processing hardware unit. The modules include a calendar module configured to, by way of the processing hardware unit, obtain a user itinerary indicating multiple appointment locations to be visited by a user of an electric vehicle and associated times to visit the appointment locations. The modules also include a routing module configured to, by way of the processing hardware unit, determine optional routes connecting the appointment locations indicated by the itinerary, and a vehicle-energy module configured to, by way of the processing hardware unit, predict states of charge, or changes in state of charge, for the vehicle in connection with the optional routes, yielding state-of-charge predictions. The routing module determines selected routing based on the state-of-charge predictions from the vehicle-energy module. Analogous methods and computer-readable storage devices are also provided.

19 Claims, 4 Drawing Sheets

(56) References Cited

U.S. PATENT DOCUMENTS

| | | | |
|---|---|---|---|
| 2011/0225105 A1* | 9/2011 | Scholer | G06Q 50/06 705/412 |
| 2012/0101755 A1* | 4/2012 | Hirasawa | H01M 10/48 702/63 |
| 2013/0066552 A1* | 3/2013 | Hamilton, II | G06Q 10/047 701/527 |
| 2013/0218458 A1* | 8/2013 | Scholl | G08G 1/0962 701/426 |
| 2013/0229153 A1* | 9/2013 | Sarkar | B60L 11/1809 320/130 |
| 2013/0339072 A1* | 12/2013 | Touge | G06Q 10/00 705/5 |
| 2013/0345976 A1* | 12/2013 | Li | G01C 21/3469 701/533 |
| 2014/0129139 A1* | 5/2014 | Ellison | G01C 21/3469 701/533 |
| 2014/0288832 A1* | 9/2014 | Hoch | B60L 3/12 701/538 |
| 2014/0316939 A1* | 10/2014 | Uyeki | B60L 11/1844 705/26.9 |
| 2015/0066837 A1* | 3/2015 | Twarog | B60L 11/1851 706/58 |
| 2015/0069970 A1* | 3/2015 | Sarkar | B60L 11/1816 320/109 |
| 2015/0239365 A1* | 8/2015 | Hyde | B60L 11/1861 701/2 |

\* cited by examiner

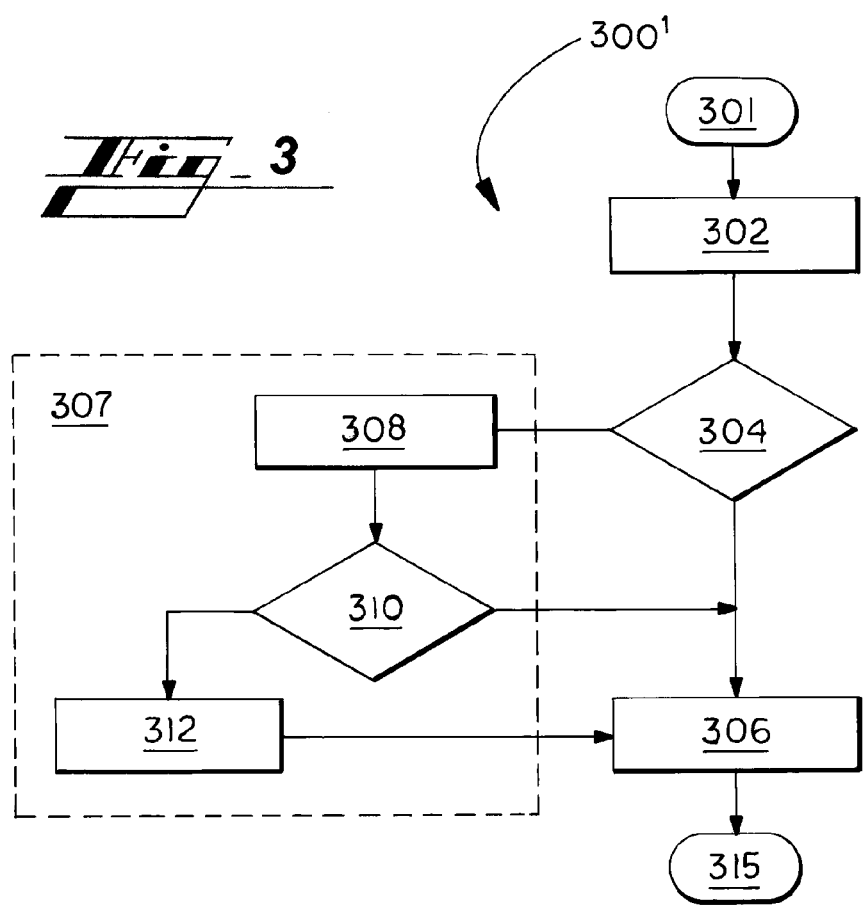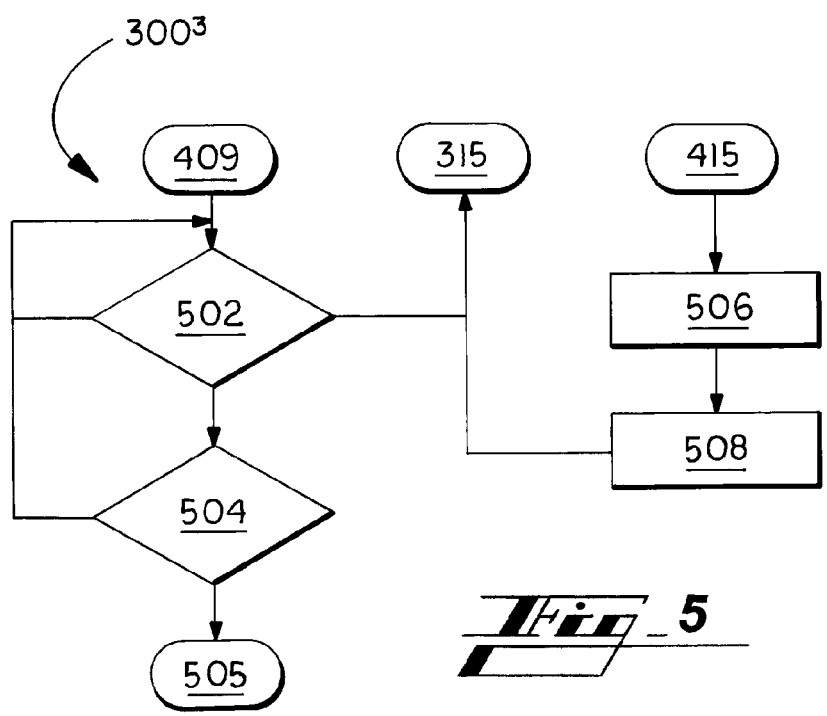

VEHICLE POWER MANAGEMENT UTILIZING OPERATOR SCHEDULE DATA

TECHNICAL FIELD

The present disclosure relates generally to systems and methods for managing vehicle power levels and, more particularly, to systems and methods for managing, and leveraging for profit, power of electric vehicles based on driver lifestyle including personal schedule.

BACKGROUND

Sales of electric, or plug-in, vehicles continues to rise worldwide. Increased adoption has both spurred and resulted from great improvements in related technologies including battery and charging systems.

Popularity has also lead to an increase in charging stations. The number of home-based charging system installations and remote charging stations has, like the number of electric vehicles on the road, increased steadily over about the last five years.

Remote charging stations remain relatively sparse, compared to gas stations, though. Users often need to change their plans significantly based on low charge. Such inconveniences, and related user range anxiety, are obstacles to greater strides in sales, use, and overall user experience for electric vehicles.

SUMMARY

The present disclosure relates to an electric-vehicle power management system including a processing hardware unit and multiple modules executable by the processing hardware unit. The modules include a calendar module configured to, by way of the processing hardware unit, obtain a user itinerary indicating multiple appointment locations to be visited by a user of an electric vehicle and associated times to visit the appointment locations.

The modules also include a routing module configured to, by way of the processing hardware unit, determine optional routes connecting the appointment locations indicated by the itinerary, and a vehicle-energy module configured to, by way of the processing hardware unit, predict states of charge, or changes in state of charge, for the vehicle in connection with the optional routes, yielding state-of-charge predictions. The routing module determines selected routing based on the state-of-charge predictions from the vehicle-energy module.

In various embodiments, the selected routing leads to at least one power station at which the electric vehicle can be charged.

In some cases, the system further comprises a plug-in-charger module configured to, by way of the processing hardware unit, predict, based on an amount of time that the vehicle is expected to be at the power station, an amount of charging at the vehicle from power station.

In implementations, the system further comprises a plug-in-charger module configured to, by way of the processing hardware unit, determine, based on an amount of time that the vehicle is expected to be at the power station, whether an opportunity exists to discharge power from the electric vehicle to the power station.

In various embodiments, determining whether the opportunity exists to discharge power from the electric vehicle to the power station involves considering at least one factor selected from a group consisting of: whether the power station is configured to receive power from plugged-in vehicles; a time of day during which the vehicle is expected to be plugged into the power station; an amount of time that the vehicle is expected to be plugged into the power station; a charge fee associated with charging at the power station during a period in which the vehicle is expected to be plugged in to the power station; and a discharge credit associated with discharging at the power station during a period in which the vehicle is expected to be plugged in to the power station.

In some embodiments, determining the selected routing comprises determining a potential travel segment to be traversed using a mode other than the electric vehicle.

In various implementations, determining the selected routing comprises obtaining user approval for using the mode other than the electric vehicle for traversing the travel segment.

In various embodiments, the vehicle-energy module is configured to, by way of the processing hardware unit, determine whether the electric vehicle will have sufficient state of charge for traversing the routing.

In various embodiments, the system further comprises the vehicle-energy module is configured to, by way of the processing hardware unit, predict a cumulative change in state of charge for the vehicle over a period of time during which the selected routing would be traversed, and determining whether the electric vehicle will have sufficient state of charge comprises comparing the cumulative change in state of charge to maximum change in state of charge for the electric vehicle.

In various embodiments, the system further comprises the routing module is configured to, by way of the processing hardware unit, determine alternative routing in response to the vehicle-energy module determining that the vehicle would not have sufficient state of charge while traversing the routes.

In various embodiments, determining the alternative routing comprising determining a potential travel segment to be traversed using a mode other than the electric vehicle.

In various embodiments, determining the alternative routing comprises obtaining user approval for using the mode other than the electric vehicle for traversing the travel segment.

In various embodiments, determining the selected routing comprises consideration of at least one factor selected from a group consisting of: expected weather conditions when the routing will be traversed; expected weather conditions when the vehicle will be charging between waypoints of the routing; road conditions along the routing; traffic expected on the road of the routing; an established user setting controlling whether a faster or more-environmentally friendly route is preferred; a vehicle setting controlling whether a faster or more-environmentally friendly route is preferred; whether an optional vehicle function is expected to be used when the routing will be traversed; whether an optional vehicle function is expected to be used when the vehicle will be charging between waypoints of the routing; location of a power station along the routing; and characteristics of the power station.

In some implementations, the calendar module is configured to, by way of the processing hardware unit, determine whether calendar entries for the itinerary are parsable and, if any entry is not parsable, access context data to identify data that can be used to render the entry parsable.

In some cases, the calendar module is configured to, by way of the processing hardware unit, determine whether calendar entries for the itinerary are parsable and, in response to determining that any entry is not parsable, access context data to obtain data that can be used to render the entry parsable.

In various embodiments, the calendar module is configured to, by way of the processing hardware unit, determine whether calendar entries for the itinerary are parsable and, in response to determining that any entry is not parsable, initiate communication with the user to obtain data that can be used to render the entry parsable.

In various implementations, the calendar module is configured to, by way of the processing hardware unit, determine that there is a deviation from itinerary or interruption in the selected routing; and the routing module and the vehicle-energy module are configured to, by way of the processing hardware unit, in response to the deviation or interruption, determine satisfactory alternative routing.

Analogous methods and computer-readable storage devices are also provided.

Other aspects of the present technology will be in part apparent and in part pointed out hereinafter.

DESCRIPTION OF THE DRAWINGS

FIGS. 3-5 illustrate methods, involving the vehicle and other systems of FIGS. 1 and 2, according to embodiments of the present disclosure.

The figures are not necessarily to scale and some features may be exaggerated or minimized, such as to show details of particular components.

In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft and marine craft, and other land-based vehicles such as electric motorcycles or scooters (e-bikes).

While the technology is developed primarily for use with so called battery electric vehicles (BEVs), it can be used with other types of vehicles, such as plug-in hybrid electric vehicles (PHEVs) and other electric vehicles.

The technology can be used with fully-manual control vehicles, and semi-autonomous- or fully-autonomous-driving-capable vehicles.

I. Systems Overview

The present disclosure describes systems for managing electric vehicle power levels based on utilizing driver lifestyle data, such as personal calendar data.

Management in various embodiments includes identifying charging opportunities for a subject vehicle based on a user schedule and geographic locations of charging stations. The system integrates a user's lifestyle into a charging plan, including generating efficient routing for driving the vehicle.

In addition to identifying and analyzing charging opportunities, the technology identifies opportunities in the user schedule to selectively sell vehicle power back to the grid. This is accomplished in some cases using an optimization program, such as a forward/backward optimization program, to determine whether charge-back can be performed, when plugged in between trip legs, and how much charge-back can be done in the window.

The technology can be performed by one or more computer systems working together. Performing systems can include, for instance, an onboard computer (OBC) of the vehicle, a mobile-device application, such as a customized app operating on the user's phone, tablet, or laptop, a user home computer, and remote servers and databases, such as of a data center.

II. Vehicle Components—FIG. 1

Figure 1:
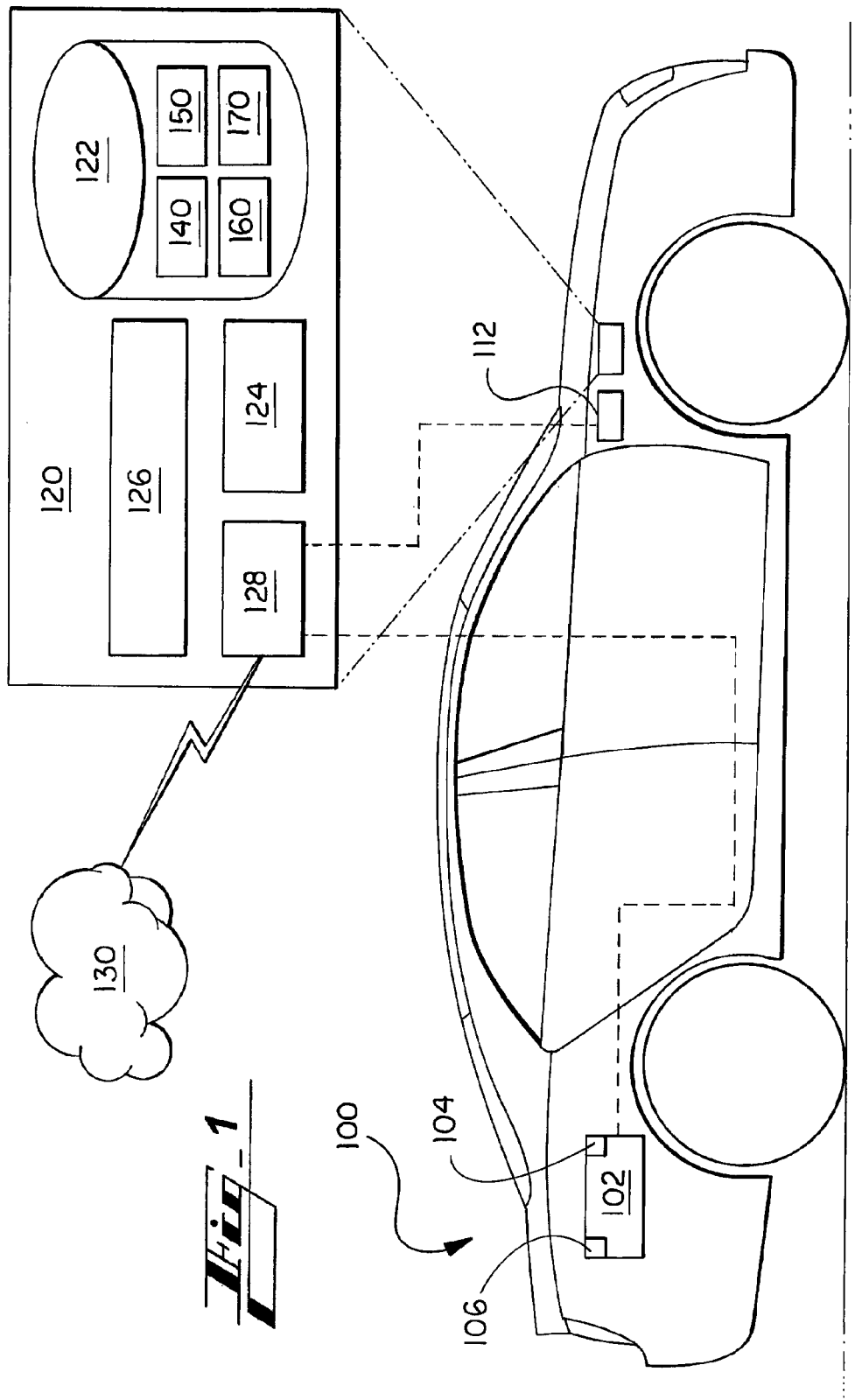
FIG. 1 illustrates schematically an automobile vehicle comprising a battery monitoring and control system according to embodiments of the present disclosure.

Now turning to the figures, and more particularly to the first figure, FIG. 1 illustrates a schematic diagram of a vehicle 100, in accordance with embodiments of the present disclosure.

The vehicle 100 comprises numerous components that can be used in connection with the present technology. Components include a battery assembly 102. The battery assembly 102 can be or include an electric battery pack, and can include or be connected to a state-of-charge sensor or device 104.

For embodiments of the present technology allowing transfer of battery charge to a charging station, for selling power to the grid, for example, the battery assembly 102 includes or is connected to a charge-direction-controlling device 106 (e.g., inverter/power electronics), controlling direction of power flow, to/from the battery.

In various embodiments, vehicle components include control components being computer controllable to affect driving of the vehicle, such as a semi-autonomous- or fully-autonomous-driving-capable vehicle.

The vehicle 100 also includes one or more vehicle-user interfaces 112. The vehicle-user interface(s) 112 include hardware by which a user, such as a driver of the vehicle, can provide input to and/or receive output from a computerized controller of the vehicle.

The interfaces 112 can include in-vehicle knobs or dials, or a touch screen, microphones, cameras, laser-based sensors, other sensors, or any device suitable for providing information to and monitoring or receiving communication from a user (e.g., driver) of the vehicle 100. User communication can include, for instance, gestures, button pushes, or sounds. The user communications can include audible sounds such as voice communications, utterances, or sighs from the user.

The interfaces 112, like all components described herein, can be referred to by a variety of terms. For instance, the interface(s) 112 can be referred to as a vehicle-driver interface (VDI), a vehicle-user interface (VUI), a human-machine interface (HMI), a vehicle input, a vehicle I/O, or the like.

FIG. 1 shows schematically such a computerized controller, or control system 120, for use in accordance with embodiments of the present disclosure. It is contemplated that the control system 120 can be implemented in one or more of a variety of forms, such as with an onboard computer, in the form of a server, within a mobile communications device, or other.

Although connections are not shown between all of the components illustrated in FIG. 1, the components can interact with each other to carry out system functions.

As shown, the control system 120 includes a memory, or computer-readable storage device 122, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The control system 120 also includes a processing hardware unit 124 connected or connectable to the computer-readable storage device 122 by way of a communication link 126, such as a computer bus.

The processing hardware unit 124 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field-PGA (FPGA), or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

The computer-readable storage device 122 includes computer-executable instructions, or code. The computer-executable instructions are executable by the processing hardware unit 124 to cause the processing hardware unit, and thus the control system 120, to perform any combination of the functions described in the present disclosure.

The storage device 122 is in various embodiments divided into multiple modules 140, 150, 160, 170, each comprising or being associated with code causing the processing hardware unit 124 to perform functions described herein.

The control-system modules 140, 150, 160, 170 can be referred to by a wide variety of terms including by functions they are configured to perform. In the latter example, for instance, the module 170 can be referred to as a user-profile module, a profile-builder module, or the like.

The control-system modules 140, 150, 160, 170 in various embodiments include a schedule-evaluation, or calendar-evaluation, module 140, a state-of-charge (SOC) or vehicle-energy module 150, a routing module 160, and a charging, or plug-in-charger, module 170. The modules can include one or more other modules. In various embodiments, any of these modules are stored and operated at another computing system, such as the remote computing system, or data center, 202 shown in FIG. 2.

As described more below, the user-schedule or calendar or user-schedule module 140 is configured, in various embodiments, with computer-executable code designed to cause the processing hardware unit 124 to perform functions including obtaining user schedule data, such as user calendar data, indicating a user schedule including at least one trip leg to be traveled by a user vehicle. The data indicates a trip destination associated with the trip leg. In some embodiments, the calendar or user-schedule module 140 is configured to generate an itinerary including the calendar or schedule entries and related times. While referred to primarily as a calendar module, herein, the schedule or calendar module 140 is not limited, unless stated expressly, to generating or otherwise obtaining, analyzing or processing, a user calendar, a user schedule, or an itinerary of any particular format or of any particular source or type of source.

The state-of-charge (SOC) or vehicle-energy module 150 is referenced primarily herein as the vehicle-energy module. The module 150 is configured, in various embodiments, to determine a predicted destination state of charge (SOC) for the vehicle battery. The determination is made based on a trip origin SOC and the SOC at a trip destination. The vehicle-energy module 150 can also calculate SOCs for the vehicle throughout an itinerary, including at intermediate destinations, or waypoints.

The routing module 160 is configured to generate or otherwise obtain travel routes between trip legs of the user itinerary, including to and from any power or charging stations that are not at a waypoint or destination. In various embodiments, the routing module 160 processes context data, such as context data from the concierge-services source 210. The context data can indicate, for instance, identification of the charging stations, station locations, expected weather condition during driving and/or charging, road conditions (e.g., road grade, road terrain, number of turns, number of stop signs, etc.), expected traffic conditions (based on historical traffic, planned road construction, etc.), the like or other.

The charging, or plug-in-charger, module 170 is configured, in various embodiments, with computer-executable code designed to cause the processing hardware unit 124 to perform functions including, for instance, determine whether a charging is or should be scheduled for a waypoint or destination. The charging module 170 can also be configured to perform functions such as determining when the battery should be charged versus drawn from to sellback power, determining how a vehicle is charged at a location—e.g., how SOC changes over a planned expected plug-in time.

The one or more other modules can perform functions, by a processor executing code of the modules, such as building or updating a user profile. The user profile can include, for instance, user preferences related to scheduling vehicle charges, communicating to the user, generating or otherwise obtaining optional routes, and optional travel modes, such as convenient and efficient opportunities to walk or use of private or public transportation options (e.g., bus, trolley, taxi, etc.) to benefit vehicle power management and/or efficiently use power resources such as to benefit the environment.

In one embodiment, the modules include an application module configured to interface with the user. The module provides information to the user and in some implementations requests or otherwise receives feedback from the user, such as regarding user preferences (e.g., 'greener' routes preferred over faster routes). The module provides information to the user and in some implementations requests or otherwise receives feedback from the user, such as approval to institute a given route plan (e.g., a plan including walking a block or two from a nearby charging station). Communications provided to the user can include a summary of the trip itinerary, including appointment locations and times to visit each. Messages for the user in various embodiments also include suggestions, notices, or alerts, such as a recommendation as to when the user should leave for a next destination or waypoint, based on the power management operations of the system. The system may determine based on traffic patterns, for instance, that the vehicle would use less power to reach the next destination if the user left within the next 15 minutes, as compared to if the user left after 30 minutes. In a contemplated embodiment, the system determines a suggested departure time based on characteristics of one or more power stations. The determination can be based, for instance, on the fact that a power station to which the vehicle is presently plugged into will soon change to a higher rate, that a power station at the next destination will be at a low rate, or lower rate as compared to the present station or as compared to the destination station in any time window (e.g., presently or later after the suggested plug in commences). Communications may also advise a user about areas or neighborhoods that the user may not want to plug in at, and/or allow the user to establish a setting, preference, or override regarding whether such power stations will be considered as options in determining routing.

While four modules 140, 150, 160, 170 are illustrated in FIG. 1 by way of example, the non-transitory computer-readable storage device 122 can include more or less modules. Any functions described herein in connection with separate modules can instead, in another embodiment, be performed by the processing hardware unit 124 executing code arranged in a single module. And any functions described herein in connection with a single module can be performed instead by the processing hardware unit 124 executing code of more than one module.

The control system 120 further comprises an input/output (I/O) device 128, such as a wireless transceiver and/or a wired communication port. The device 128 can include, be a part of, or be a tangible communication device. The processing hardware unit 124, by way of the I/O device 128, and executing the instructions, including those of the mentioned modules 140, 150, 160, 170, sends and receives information, such as in the form of messages or packetized data, to and from one or more vehicle components, including vehicle control components, such as battery charging, charge-back, use, and monitoring components.

In some implementations, the I/O device 128 and processing hardware unit 124 are configured such that the unit 124, executing the instructions, sends and receives information to and from one or more networks 130 for communication with remote systems. Example networks 130 can include the Internet, local-area networks, or other computing networks, and corresponding network access devices include cellular towers, satellites, and road-side short- or medium-range beacons such as those facilitating vehicle-to-infrastructure (V2I), or vehicle-to-other (V2X).

In some embodiments, such as when the system 120 is implemented within a vehicle 100, the system 120 includes or is connected to one or more local input or output devices, such as the user-vehicle interfaces 112 and battery-related devices 104, 106. The inputs or output devices can also include other vehicle sensors, such as positioning system components (e.g., GPS receiver), speed sensors, and camera systems.

Any of the components described herein can be considered a part of a kit, apparatus, unit, or system, which can be manufactured and/or sold as an individual product.

III. Example Environment For Implementation—FIG. 2

Figure 2:
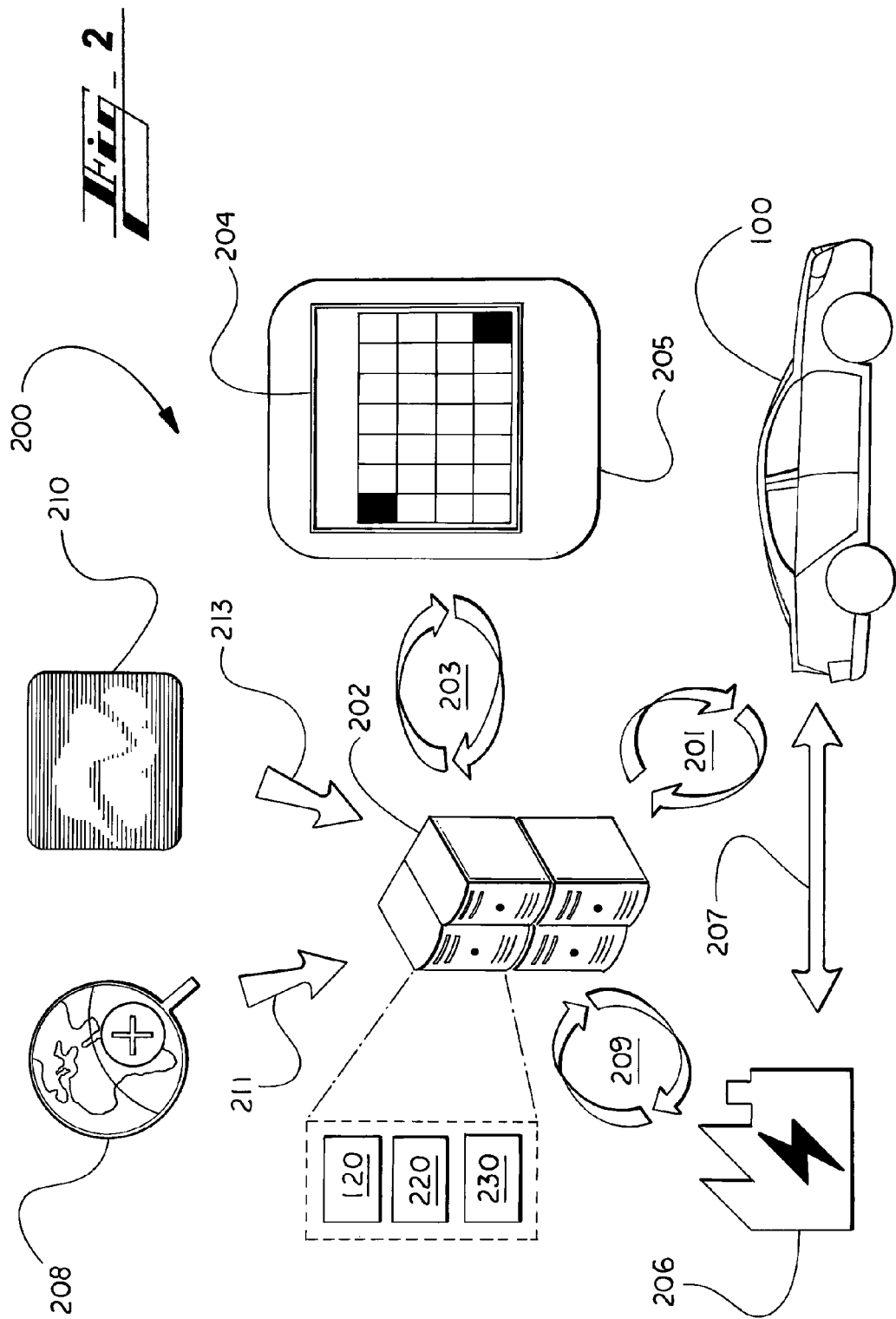
FIG. 2 illustrates an example environment in which the present technology is implemented.

FIG. 2 illustrates an example environment 200 in which the present technology is implemented. The environment 200 includes the vehicle 100 of FIG. 1.

Environment components include any of the vehicle 100, a remote computing system 202, a user schedule source, such as calendar 204, a user computing device 205, a power system 206, a geographic-information source 208, and a concierge-services source 210.

In various embodiments, the vehicle 100 communicates with a remote computing system 202, as indicated by reference 201 in FIG. 2.

The remote computing system 202 can part of a data, customer-service, or control center. An example center is the OnStar® customer-service center, having facilities for interacting with vehicles and users, whether via the vehicle or otherwise (e.g., mobile phone) via long-range communications, such as satellite or cellular communications. (OnStar is a registered trademark of the OnStar Corporation, which is a subsidiary of the General Motors Company) For simplicity, and in a non-limiting manner, the remote computing system 202 is referred to primarily below as the data center 202.

In various embodiments the data center 202 stores or has access to a user schedule source, such as calendar 204, as indicated by arrows 203 in FIG. 2.

The data center 202 includes one or more computers. Each can be configured generally like the computerized controller, or control system described above in connection with FIG. 1, as indicated by the same reference numeral 120 for the data center 202 in FIG. 2.

In various embodiments, the data center 202 comprises multiple software models, such as a vehicle-energy model 220 and a plug-in model 230, or plug-in charger or charging model. In other embodiments, one or both models 220, 230 are part of another component of the environment 200, such as the vehicle 100 or another user device 205, described more below.

The vehicle-energy model 220 and the plug-in model 230 can be portions of a single module or distinct modules interacting. The models are, in various embodiments, part of the state-of-charge (SOC) module 150 and/or charging module 170, whether one or both of these modules are maintained at the vehicle 100, the user mobile device 205, the data center 202, or elsewhere.

Generally, the vehicle-energy model 220 is configured to, when executed by a processor like the processing hardware unit 124 shown in FIG. 1, estimate vehicle battery charge states or levels (SOC) in connection with multiple future scenarios. Each scenario corresponds to trip legs indicated by the user calendar 204. The trip legs include origins, destinations, and any waypoints of trip legs identified by the calendar 204. The trip legs can be represented simply by driving distance and related factors, such as temperature, terrain, and changes in road conditions (e.g., road grade, number of turns, number of stop signs, etc.).

For estimating the vehicle-battery SOC that the vehicle 100 will have after a charging, or charging/discharging, stop (e.g., between trip legs of the user itinerary), the vehicle-energy model 220 consults the plug-in model 230. The plug-in model 230 is configured to, when executed by the processor, determine how (e.g., how much) the battery SOC will change in the stop. The plug-in model 230, in various embodiments includes the optimization program, such as the forward/backward optimization program, described above, for determining how the battery should or will be charged, or charged/discharged, during the stop. The plug-in model 230 is configured to calculate an estimated battery SOC at the end of the stop (e.g., at start of a next trip leg) based on the SOC at the start of the stop (e.g., end of the prior trip leg).

The plug-in model 230 is described further below in connection with the methods of FIGS. 3-5.

With continued reference to FIG. 2, in some implementations, a version of the calendar 204 is maintained at any or all of the data center 202, the vehicle 100, and one or more other user computing devices 205, such as a smart phone, laptop, tablet, or other mobile or stationary computing device such as a home desktop computer.

The user computing device 205 in various embodiments includes components generally like the computing system of FIG. 1, as indicated by the same reference numeral 120 within the user device 205 of FIG. 2.

In various embodiments, the user can manage—e.g., populate and update—the calendar 204 by way of any of a variety of channels, such as via a user-vehicle interface 112 of the vehicle 100 (FIG. 1) or the user device 205.

Data shared between the calendar 204 and other entities (e.g., the user, the vehicle 100, the user device 205, and/or other) can include itineraries, updates to the same, and applicable alerts.

The environment 200 also includes a power system 206. The power system 206 in various embodiments includes computing systems monitoring or managing an electric-power source, such as a source providing power to power stations.

As shown by arrow 207, the vehicle 100 can communicate with the power system 206, such as to receive/deliver power, and/or to exchange messages or other data supporting performance of the functions described herein.

As shown by arrows 209, the data center 202 can communicate with the power system 206. Information shared can include load schedules, pricing, and charging-station characteristics, such as location, voltage, or charging speed or rate.

In various implementations, the data center 202 or a system connected thereto (e.g., charging station infrastructure) is configured to determine an identity of the vehicle 100 when connected to the charging station. The identification is used in tracking monetary or other credits to be applied to a user account for discharging. The functions can be performed by a customized version of existing systems used to identify vehicles charging at the station, such as to arrange payment of power transferred to the vehicle 100.

The environment 200 also includes a geographic-information source 208. In various embodiments, data from the geographic-information source 208 is used, such as by the data center 202, the vehicle 100, or the user device 205, to determine vehicle location.

In various embodiments, data from the geographic-information source 208 is used, such as by the data center 202, the vehicle 100, or the user device 205, to determine geographic data relevant to the vehicle or user. The geographic data may include one or more travel routes and/or driving distances, between points for a future user-trip leg identified based on the user calendar 204. The points can separate, for instance, an origin and a destination, or an origin and a waypoint, or a waypoint and a destination, for the future user-trip leg.

In some implementations, the geographic data includes traffic data (e.g. historic traffic data). The geographic data includes topography information in some implementations, such as temperature, road conditions (e.g., road grade, road terrain, number of turns, number of stop signs, etc.), and changes in these things. In some embodiments, temperature data is received from the concierge-service source 210.

In a contemplated embodiment, the geographic-information source 208 determines the one or more travel routes and/or driving distances, outputting results to a component—e.g., the data center 202, vehicle 100, or user device 205—which may have requested the results.

The concierge-services source 210, like all components described herein, can be referred to by other names, the concierge-services source 210 can be referred to as a weather-data source, an ancillary-data source, for instance.

The concierge-services source 210 includes one or more servers in various embodiments. The concierge-services source 210 is configured to provide any of various useful contextual data. The contextual data in some implementations includes present and/or historic local weather information—local to the vehicle routing being planned.

In some cases, the contextual data includes information about charging stations. Charging-station information includes information indicating location of charging stations on or near planned trip legs for the vehicle. In addition to geographic location, the information can also include for each station charging-station characteristics, such as charging speed or rate, voltage, charging-price cost, fee or rate, and identity of an operator of the station. In a contemplated embodiment, the context data indicates whether a charging station(s) is configured to allow discharge, or transfer of power from vehicles to the station, and/or related conditions such as speed of such transfers and price/value that can be credited to a user account or other account in connection with the transfers.

Though connections are not shown between every component of FIG. 2, each can communicate with each of the others in various embodiments. For example, the vehicle can communicate directly with the concierge-services source 210, though the concierge-services source 210 is shown communicating directly with the data center 202.

While some communication arrows indicate unidirectional communications (e.g., arrows 211, 213), communications can flow in both directions. The data center 202 can send requests or other messages or data to the concierge-services source 210.

Features of the environment 200 can be combined or separated in any of a wide variety of manners to perform functions of the present disclosure. Any function described herein in connection with one component, can be performed by two components, for instance, and any function described herein as being performed by multiple components can be performed by a single component.

IV. Methods Of Operations—FIGS. 3-5

Figure 4:
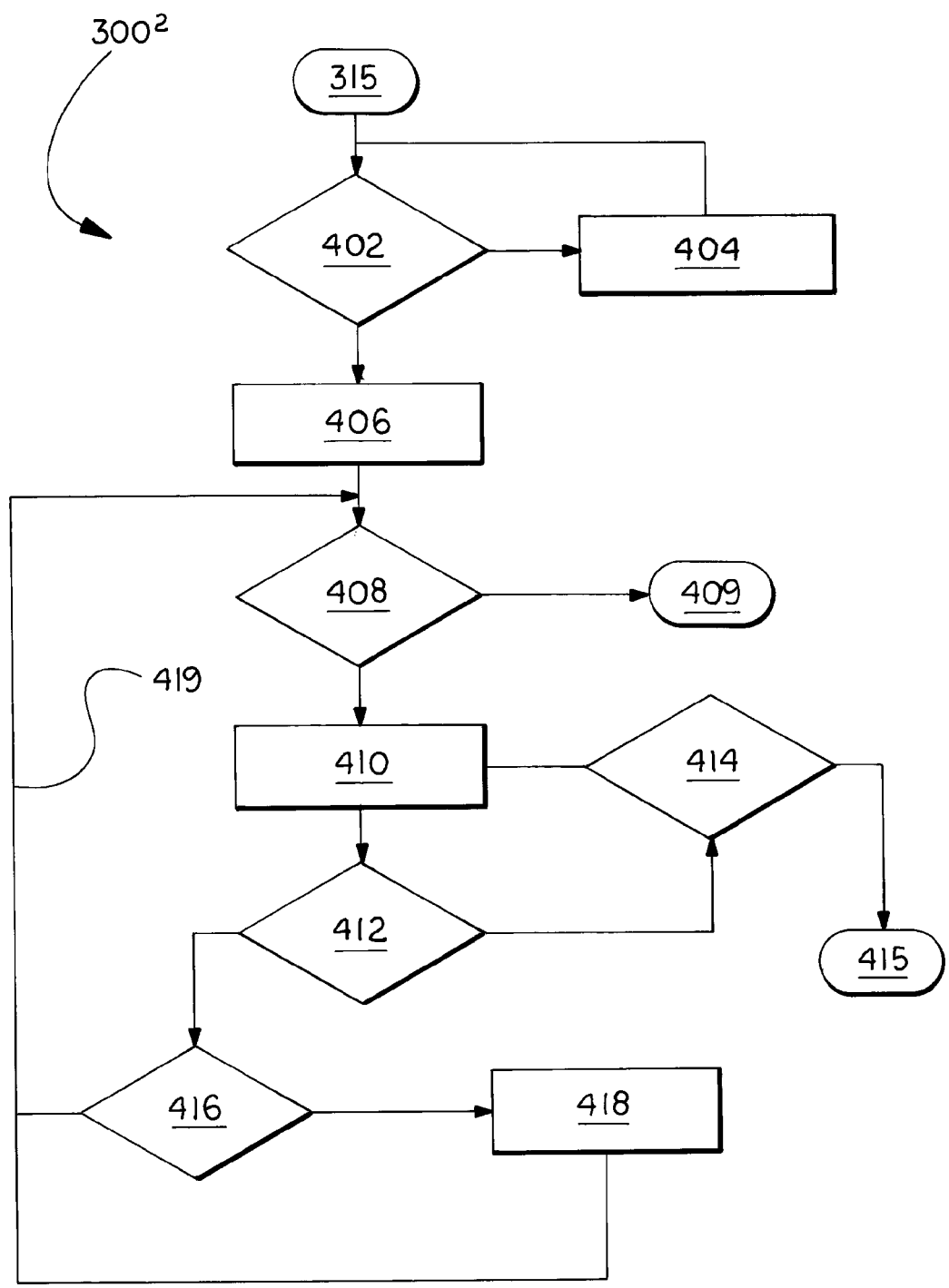

FIGS. 3-5 shows an algorithm by which the present technology is implemented, outlined by flow charts as methods (or processes, evaluations, sub-methods, or routines) 300$^1$, 300$^2$, 300$^3$ according to various embodiments of the present disclosure.

The figures illustrate methods, involving the vehicle 100 and other systems of FIGS. 1 and 2, according to embodiments of the present disclosure.

It should be understood that operations of the methods 300$^1$, 300$^2$, 300$^3$ are not necessarily presented in any particular order and that performance of some or all the operations in an alternative order is possible and is contemplated. The operations have been presented in the demonstrated order for ease of description and illustration. Operations can be added, omitted and/or performed simultaneously without departing from the scope of the appended claims. It should also be understood that the illustrated method 300[1], 300[2], 300[3] can be ended at any time.

In certain embodiments, some or all operations of the processes, and/or substantially equivalent operations are performed by execution by a computer processor, such as the processing hardware unit 124, of computer-readable instructions stored or included on a non-transitory computer-readable storage device, such as the storage device 122 shown in FIG. 1. The processor and/or the hardware in various embodiments includes another processor and/or storage device, such as a processor and hardware unit remote to the vehicle 100, such as that of the data center 202. The instructions can be arranged in modules, such as the modules 140, 150, 160, 170 described, whether the modules are maintained at the vehicle 100, the user mobile device 205, the data center 202, and/or elsewhere.

The method 300 is in various embodiments performed with respect to multiple trip legs (e.g., origin/destination pairs) scheduled, according to the user calendar, in a certain time window or period. Example time periods include a day, a week, etc.

The method 300 begins 301 and flow proceeds to block 302, whereat the processing hardware unit 124 reads, or obtains and reads, entries from a user calendar 204, from executing code of the calendar module 140, whether it is maintained at the vehicle 100, the user mobile device 205, the data center 202, or elsewhere.

At diamond 304, the processor determines whether each calendar appointment, appointment data item, or entry is parsable, or configured in a manner allowing contents of the entry to be used in further operations of the methods 300[1], 300[2], 300[3], For instance, the calendar module may be configured so that the executing processor can use a meeting location calendar entry of 123 Main Street, Detroit, Mich. 48083 because it is an address, and so can be easily correlated to positioning coordinates or other positioning convention used.

In some embodiments, the calendar module may be configured such that entries such as "work" or "Comerica Park" are found parsable in that they can easily be converted to an address and then to positioning coordinates, or directly to positioning coordinates, using correlation data available, such as from a look-up table. In other embodiments, the calendar module may be configured such that entries such as "work" and "Comerica Park" are not found parsable, because more work is required in determining the coordinate location as compared with processing an accurate street address.

In some embodiments, the operation 302 includes generating an itinerary based on calendar entries. The system could, for instance, use the appointments on the calendar and known locations to create the itinerary including the times and locations for the origin, waypoints, and final destination for a time window, such as a day, a week, or other period.

If each calendar entry is determined parsable at the read operation 304, flow proceeds to block 306 where each entry is parsed.

If any entry is determined to be non-parsable at diamond 304, flow proceeds to block or sub-routine 307 whereat the processor initiates making parsable each of the problematic entry or entries. The sub-routine can include accessing context data, such as historical context data—prior user calendar entries, for example.

Making each entry parsable 307 can be performed in any of a variety of ways. As an example, at block 308 the processor compares errant data of each non-parsable entry to other available data. The other available data can include, for instance, user-related data, such as data of non-errant entries, present or historical.

By this step, the processor may identify that a non-parsable calendar entry item, such as regarding location of a meeting, is just a misspelling of a location at which the user has previously met or a location at which the user will have another meeting.

As another example, the processor may at this step 308 obtains context data, such as user phone book data.

At diamond 310, the processor determines whether the available context data is sufficient to make parsable each non-parsable entry, and if so to parse the entry. If so, then flow proceeds to block 306 where the calendar entries are parsed. If not, flow proceeds to block 312, where the processor initiates communications with the user to cure any remaining shortcomings.

The user may have, in creating the calendar entry, indicated a meeting location in a manner different than used in connection with the location or meeting. For instance, assume that a user has a regularly scheduled dinner each first Friday at the house of their friend, Joe Smith, and usually posts the location by Joe's home address, 456 Elm Street, Detroit, Mich. 48083. The location can be known to the system as Joe Smith's house based on the user's electronic address book, for instance. On one occasion, though, the user typed for the location of the same regular dinner, "Joe Smith's house." The system can be configured to, at step 310, determine based on the available context data, from step 308, that the meeting is at Joe's home address, 456 Elm Street, Detroit, Mich. 48083.

In some embodiments, the system can, here, interact with the user about any ambiguous, non-parable, entry, even if the calendar module, as configured, can determine how to make the entry parsable with a relatively high degree of certainty, such as based on an apparent misspelling. If, for instance, an entry for a regularly-scheduled dinner calendar entry stated "Jane Smith's house," the processor at step 312 may ask the user whether the entry should be Joe Smith's house—e.g., "Wanted to check to see if the location of this meeting should be 'Joe Smith's house,' where you usually have dinner on first Fridays.

From block 306, upon parsing of subject calendar entries, flow proceeds to transition oval 315, continued in FIG. 4 by a subsequent portion 300[2] of the method 300.

From transition oval 315 in FIG. 4, at decision diamond 402, the processor determines whether a trip is ongoing. If the trip is ongoing, flow proceeds to block 404 whereat the performing system engages a route-management mode including operation of a projected-range agent. In this step, the processor ensures that the route-management mode only performs calculations starting with the next item on the user's itinerary when a trip is already ongoing.

If a trip is not ongoing, flow proceeds to block 406. In some embodiments, flow can proceed to both 404 and 406. That is, the system can both engage the route-management mode, including the projected-range agent, at block 404 and also start the trip planning beginning at block 406.

At block 406, the processor determines possible routes for each trip leg, or link, using origin location-destination location pairs from the user calendar. The operation 406 can be performed by the routing module 160 mentioned, whether it is maintained at the vehicle 100, the user mobile device 205, the data center 202, or elsewhere. In various embodiments the operations involve the process determining all possible routes, for use in determining best routing between trip legs for the applicable time window (e.g., day).

The information can be retrieved from one or more databases or servers, such as a map database or server, such as of the geographic-information source 208 or the concierge-service system 210 of FIG. 2. The routing data can include context data such as historic travel times for the routes identified, elevation changes, road conditions, traffic conditions (based on historical traffic, planned road construction, etc.), the like, or other. In a contemplated embodiment, the routing data can include, or be supplemented by weather data.

Flow proceeds to decision diamond 408 whereat the processor determines whether an entire routing and charging/discharging plan for the subject time window (e.g., a day) has been calculated and is valid. Determining whether the plan is valid in various embodiments includes determining whether the plan allows the vehicle to have target SOC, or at least sufficient SOC throughout the window.

In response to an affirmative determination at diamond 408, flow proceeds to transition oval 409, which continues to FIG. 5, described below.

In response to a negative determination at diamond 408, flow proceeds to block 410 whereat the processor, for a first trip leg of the window—from, e.g., an itinerary starting point to a first stop or waypoint, calculates a change in SOC ($\Delta SOC$) for the trip leg. The calculation is based on a route planned. The calculation is based also, in various embodiments on any of a wide variety of context data, such as (i) user preferences established, such as whether a faster route or a "greener" route (more-environmentally friendly route) is preferred, (ii) vehicle route-preference settings such as whether a faster route or a greener route is preferred, (iii) vehicle settings, such as whether an optional vehicle function, such as that of a vehicle air-conditioning system, is expected to be used and the effect of such operation on battery charge, (iv) expected weather conditions, (v) location of one or more charging stations, (vi) characteristics of the charging stations (e.g., whether the stations accept vehicle-battery discharge, and at what rates), and/or (vii) the like and other.

In a contemplated embodiment, the system is configured to incorporate user habits, or historic activities, into calculating routes for the itinerary. The system could determine, for instance, that that user usually makes a ten-mile frolic in her Friday evening commute to visit her best friend's house, though the visit is not on the user's calendar. In some embodiments, the system is configured to communicate with the user to confirm whether the frolic will be made in a given time window. The communication could occur at any stage of the evaluation 300, such as at in connection with any of the steps 312, 502, 506, 508, for example.

In a contemplated embodiment, the system simply considers a resulting SOC for each trip leg, ensuring that there is sufficient SOC at each point within the planned itinerary.

In one embodiment, at decision diamond 412, the processor compares a cumulative change in SOC ($\Delta SOC_{cumulative}$), including the change in SOC for each trip leg processed in the iterations of the process 300 thus far, to an inherent or pre-established maximum cumulative change in SOC (or just max change in SOC) for the vehicle ($\Delta SOC_{max}$), to determine whether the routing being tested is satisfactory—e.g., to determine whether the routing can be traversed wholly without exceeding the amount of energy currently stored in the battery. In another embodiment, this can be tested directly by comparing the numerical value of SOC to a minimum threshold and ensuring that the minimum threshold is not violated.

The comparison in various embodiments includes determining whether the $\Delta SOC_{cumulative}$ bears a predetermined relationship to $\Delta SOC_{max}$, such as whether the $\Delta SOC_{cumulative}$ is equal to or greater than $\Delta SOC_{max}$. In this example, $\Delta SOC_{cumulative}$ cannot, in this case, exceed the maximum allowable change in charge, or maximum set change in charge. The operation can include determining whether $SOC_{cumulative} > SOC_{Min}$.

In response to a positive determination at diamond 412, flow proceeds to decision diamond 414, whereat the processor determines whether alternate routing, such as an alternate route link, exists that would apparently lead to a negative determination at diamond 412. If such alternative routing exists, flow proceeds back to block 410 for processing of that blocks operations with the alternate routing identified at diamond 414. If such alternative routing is not found, flow proceeds to transition oval 415, which continues to FIG. 5, described below. The operation 414 can be performed by the routing module 160 mentioned, whether it is maintained at the vehicle 100, the user mobile device 205, the data center 202, or elsewhere.

In response to a negative determination at diamond 412, flow proceeds to decision diamond 416 whereat the processor determines whether the vehicle is expected to be plugged in at the end of the subject trip leg—i.e., that it is expected to be charging, or charging/discharging. In response to a negative determination at diamond 416, flow proceeds back to diamond 408 for performing per-trip-leg operations (e.g., 408, 410, 412, etc.) in connection with a next trip leg.

This process is continued, in connection with the various trip legs, until a positive determination is reached at diamond 408, leading to the transition oval 409, which continues to FIG. 5.

In response to a positive determination at diamond 416, flow proceeds to block 418, representing a plug-in model mentioned above. Generally, the plug-in model determines, using a state-of-charge (SOC) at the end of a leading trip leg and an estimated amount of time available for charging/discharging, how much the vehicle can be charged and whether there is, in the plug-in episode, one or more opportunities to discharge the battery to the grid. A user account can be credited for such discharging, such as with cash credit, points, the like or other. An output of the plug-in model is a SOC that the vehicle will have at the end of the plug-in episode, between the leading trip leg and a next trip leg.

In determining whether there is an opportunity to discharge the battery, the processor considers various factors. One factor is whether there is time after any such discharging, to charge back up sufficiently. The charge up can occur at the present plug-in or a subsequent plug in. For instance, if the vehicle discharges from 90% down to 30% SOC, it may be sufficient to leave the vehicle at 30% because the itinerary only calls for a two-mile drive home whereat the vehicle will be fully charged overnight at low rates. Or it may be sufficient if there is only time to charge from the low of 30% SOC at the plug-in episode to 70% because the itinerary only calls for a 20 mile drive to a next stop whereat there is time, considering capabilities of the power station at the next stop, to top off the battery charge.

Another factor in determining whether there is an opportunity to discharge the battery one or more times at a stop is the fee, or price of electric energy and/or power at the subject charging station. The algorithm is configured generally to identify opportunities to discharge when credits, for instance, discharge rates, are higher, such as at peak charging times, and charge when fees, for instance, charging rates, are lower, at off-peak charging times.

Determining whether there is an opportunity to discharge the battery one or more times in some cases involves using an optimization program, such as a forward/backward optimization program, to determine whether charge-back can be performed, when plugged in between trip legs, and how much charge-back can be done in the window.

It is noted that power rates may not have a binary structure—only on and off peak. In some circumstances, there are more than two rates, such as three or more levels. The rates can also be dynamic, changing in relative real time based on power demand. The system is configured to evaluate the rate structure, whatever its form, to determine whether charging/discharging is possible.

An applicable charge rate can depend on any of various features beyond time of day, such as charge/discharge power level, time of the week (e.g., weekday vs. weekend), time of year, temperature, the like, or other.

The program in contemplated embodiments considers whether slight differences in pricing, or resulting charge/discharge value to the user make charging/discharging worthwhile. If the rate structure and time available for charge/discharge only affords a slight value (e.g., profit) to the user, the program may determine that it is not worthwhile, considering, e.g., the slight wear put on the battery by the cycling. In a contemplated embodiment, the user can establish relevant preferences considered at this phase, such as a threshold potential profit that must be identified before charging or discharging is planned and performed.

In various embodiments, the optimization program involves a first stage of backward searching. If the backward search does not identify a satisfactory charging/discharging plan for the stop, flow proceeds to a second, forward-searching stage. If the forward searching also does not yield a satisfactory charging/discharging plan for the stop, flow proceeds to a third stage, which can also be forward-searching. In the third stage, whereat potential charging does not have to occur during off-peak or lower-fee times in order to reach a desired state of charge ($SOC_{final}$). In the third stage, it may be determined that there is not a satisfactory charging/discharging opportunity for the plug-in episode that would lead to a full battery ($SOC_{max}$). These stages are described more below.

In the first, backward-search stage, the optimization program seeks to identify an optimum trajectory for charging/discharging by going backwards in time from a target final target battery state of charge ($SOC_{final}$). In doing so, the program traverses all rate segments backwards, seeking, again, to, based on the applicable power rate structure, charge at lower-rate times (e.g., off peak) and discharge when rates are higher (e.g., on peak). A satisfactory charging/discharging episode is found in backward searching when a SOC path can be created that leads backward in time, from the target $SOC_{final}$, through one or more charges and discharges, and ends at an initial state of charge ($SOC_{initial}$), which is known as the SOC that the vehicle will have upon ending the preceding trip leg. In some embodiments, if a charge/discharge scenario is not identified, searching backward, using a full battery as the $SOC_{final}$ (e.g., $SOC_{max}$), flow proceeds to the second stage, described more below. In a contemplated embodiment, though, while the target $SOC_{final}$ is often a full battery ($SOC_{max}$), the target $SOC_{final}$ may be set lower. This can be the case if the system has determined that the user will next be plugged in long term at a charging station, such as an airport charging station a few miles away while on a trip. The optimization program in some embodiments, in backward searching for workable charge/discharge scenarios, identifies whether there are any opportunities that would not charge and/or discharge the battery fully during the plug-in episode, but may be satisfactory because a charging/discharging scenario exists that would, looking backward, lead from the $SOC_{final}$ and end at the known $SOC_{initial}$.

In the second, forward-search, stage, the optimization program seeks to identify an optimum trajectory for charging/discharging by searching forward in time, from the known initial state of charge ($SOC_{initial}$). In doing so, the program traverses all rate segments forward, seeking, again, to, based on the applicable power rate structure, charge at lower-rate times (e.g., off peak) and discharge when rates are higher (e.g., on peak). A satisfactory charging/discharging episode is found in forward searching when a SOC path can be created that proceeds forward in time, from the $SOC_{initial}$, through one or more charges and discharges, and ends with the battery having the applicable target $SOC_{final}$. In some embodiments, if a charge/discharge scenario is not identified, searching forward, using a full battery as the $SOC_{final}$, flow proceeds to the third stage. In a contemplated embodiment, though, the target $SOC_{final}$ need not be a fully-charged state ($SOC_{max}$), and depends on system settings and in some cases to context (e.g., if the system determines that the user will next be plugged in long term at a charging station). And, in forward searching, like the backward searching, the optimization program in some embodiments, in searching for workable charge/discharge scenarios, identifies whether there are opportunities that would not charge and/or discharge the battery fully during the plug-in episode, but may be satisfactory because a charging/discharging scenario exists that would, looking forward, lead from the $SOC_{initial}$ to the target $SOC_{final}$.

In the third, forward-search, stage, the optimization program seeks to identify an optimum trajectory for charging/discharging by searching forward in time, from the known initial state of charge ($SOC_{initial}$). In doing so, the program traverses all rate segments forward, seeking to, based on the applicable power rate structure, charge at lower-rate times (e.g., off peak) and charge/discharge when rates are higher (e.g., on peak). A satisfactory charging/discharging episode is found in forward searching when a SOC path can be created that proceeds forward in time, from the $SOC_{initial}$, through one or more charges and discharges, and ends with the battery having the applicable target $SOC_{final}$. In some cases, the processor determines that there is not a satisfactory charging/discharging opportunity for the plug-in episode that would lead to a set target $SOC_{final}$, such as a full battery ($SOC_{max}$). In cases in which only a full battery ($SOC_{max}$) was used in the searching of the first two stages, the third stage, in a contemplated embodiment, determines whether a workable charging/discharging scenario exists resulting in a sufficient final charge ($SOC_{final}$) short of a full battery ($SOC_{max}$). The solution may be workable if, as provided by way of example, the system has determined that the user will next be plugged in long term at a charging station. Evaluating context data to determine whether such a solution, though not leading to full battery, exists can include the system re-performing the first stage, looking backward using a new, lower, $SOC_{final}$, and, if that is not successful, re-performing the second stage, looking forward from the known initial $SOC_{initial}$ to see if a charging/discharging scenarios exits that would lead to the new, lower, $SOC_{final}$.

The operations of block 418 output a resulting state of charge for the applicable plug-in stop ($SOC_{final}$), which is input into relevant subsequent steps provided of the overall evaluation 300, as indicated by return path 419 in FIG. 4.

In various embodiments, the performing system(s) is configured to reserve at least one charging station, along the user route determined, for use by the user for a time period that the user is expected to be at the station. The arranging can include a performing system, such as that of the vehicle or the remote computing system, or data center, 202, interfacing with a corresponding system, such as private or public station-reservation server. The operation can be performed using the routing module or the calendar module, for instance. The system can also be configured to suggest, to the user, that the system make such reservation. Reserving a station for a select time has benefits including ensuring that the user will be able to plug in when expected, promoting accuracy of the predicting algorithms described herein, which in various cases presume that the vehicle can plug-in when expected.

FIG. 5 shows operations following the two transition-out ovals 409, 415 of FIG. 4. From transition oval 409 in FIG. 5, flow proceeds to decision diamond 502 whereat the processor determines whether there are any deviations from the itinerary. The decision 502 can be performed by the routing module 160 mentioned, whether it is maintained at the vehicle 100, the user mobile device 205, the data center 202, or elsewhere.

In various embodiments the system is programmed to recognize and act on any one or more types of deviations, such as interruptions in planned routing, such as by unexpected traffic or new construction/detour, user changes to the itinerary, such as due to venue change or adding/cancelling a meeting of the itinerary, changes in present or expected weather conditions, other changes in the route environment, or any other relevant changes to the plans.

In response to a positive result of diamond 502, flow proceeds to transition oval 315, which leads to the same oval in FIG. 4, so that relevant subsequent steps provided of the overall evaluation 300 can be performed using the updated data identified at diamond 502.

In response to a negative result of diamond 502, flow proceeds to decision diamond 504 whereat the processor determines whether the itinerary is complete—i.e., has actually been performed. If not, flow proceeds back to diamond 502. Regarding diamond 504, if the user is on vacation, for instance, with the vehicle parked at the airport for instance, the algorithm will cycle to determine whether any changes are made. The user may book an earlier or later flight back to the vehicle, for example. Such change would be recognized by a calendar update, which would be recognized at diamond 502, and so lead to transition oval 315 for processing of the update in the relevant subsequent steps provided of the overall evaluation 300.

The method 300 is continued from the transition oval 409 in FIG. 4 to the oval 409 in a next portion $300^3$ of the method in FIG. 5.

The method 300 is continued from the transition oval 415 in FIG. 4 to the oval 415 in a subsequent, third, portion of a subsequent part $300^3$ of the method in FIG. 5.

With continued reference to FIG. 5, from transition oval 415, taken from the same oval in FIG. 4, flow proceeds to block 506 whereat the processor communicates with the user (such as by a vehicle-driver interface (e.g., the VDI 112 of FIG. 1), user mobile device (e.g., 205 in FIG. 2), etc.), about a potential change to the itinerary. The operation 506 can be performed by the routing module 160 mentioned, whether it is maintained at the vehicle 100, the user mobile device 205, the data center 202, or elsewhere.

In various implementations the communication includes suggesting a planned change to the user and/or inquiring of the user about a possible change. The change can include, for instance, a change allowing the vehicle to stay plugged in longer between a certain two adjacent trip legs. The longer plug-in could allow the battery to charge longer toward a target SOC for that link in the itinerary and/or allow for more profit by enabling more discharging at the stop, along possibly with time to charge back up to a desired resulting SOC for the stop. The change could include rerouting, outside of a previous planned route, such as to a charging station that is not at the next stop or waypoint, but convenient to it, such as by being a short walk, cab, or private or public transportation (e.g., bus, trolley, rail, taxi cab, etc.) away from the waypoint.

In a contemplated embodiment, the system is configured to arrange, or suggest to the user, using a non-vehicle mode (for instance, walk, taxi cab) occasionally, such as regarding a charging station located conveniently near, but not at, a waypoint of the itinerary, including other than at block 506. The suggestion or arrangement can be provided, for example, in connection with the operations of block 406. The arranging can include reserving a mode of transportation, such as a bus, train, trolley, taxi ride, Uber, or Lyft ride. The operations can be performed by the routing module 160 mentioned, whether it is maintained at the vehicle 100, the user mobile device 205, the data center 202, or elsewhere, or by another module. The arranging can include a performing system, such as that of the vehicle or the remote computing system, or data center, 202, interfacing with a corresponding system, such as a taxi application or server to make the reservation. The system can arrange travel to and/or from a meeting on the user itinerary. The suggesting operation can include suggesting that such reservation be made or details for such potential or existing reservation.

It is further contemplated that the system can be configured to allow setting of preferences, system or user preferences, controlling whether such suggestions are made, whether such alternative-mode routing is made automatically under all or some conditions, the like or other, in connection with block 506, or otherwise, such as in connection with the operations of block 406.

Flow proceeds to block 508 whereat the processor receives and processes user input, responsive to the suggestion or inquiry of block 506, indicating any user-identified or user-agreed-to alternative routing, stays between trip legs, or other plans. From block 508, flow proceeds to transition oval 315 for processing of any such changes update in the relevant subsequent steps provided of the overall evaluation 300.

In response to a positive determination at diamond 504, flow proceeds to oval 505, whereat the process 300 can end, or be repeated, such as in connection with another set of trip legs—e.g., another time period, such as for another day, week, etc.

V. Select Benefits Of The Present Technology

Many of the benefits and advantages of the present technology are described above. The present section restates some of those and references some others. The benefits are provided by way of example, and are not exhaustive of the benefits of the present technology.

In various embodiments, the present technology saves user time and effort related to ensuring they have sufficient driving range.

The technology in some implementations is configured to adapt dynamically, or in real-time, to changes in a user's schedule, habits, or activities.

The technology maximizes use of renewable energy. In some implementations, the system selectively encourages non-vehicle travel. For example, the system may suggest walking or using public transportation at a point in a user's schedule in which leaving the vehicle charging would be more beneficial to vehicle power management for the day than to drive immediately to a next waypoint for the day, where there may be a limited charging opportunity. The waypoint may not have a station, for instance, or a station having an insufficient charging rate to charge the battery pack as needed in available time for a next trip leg.

In identifying opportunities to sellback power, from the vehicle to the grid or power source, the systems provide users with direct financial benefits (e.g., cash credit) or indirect financial benefits (e.g., user account points or rewards).

A company operating related systems can benefit financially from increase product sales, such as of electric vehicles or related hardware and/or software packages for providing the present technology.

A company can also profit from fees (e.g., percentage of sellback credit), subscription sales, or the like related to the company's identification, management, or other provision or facilitation, of sellback opportunities.

The present technology can be used with a variety of transportation vehicles including automobiles, electric motorcycles, scooters (e-bikes), aircraft, and marine craft.

The technology can be used with battery electric vehicles (BEVs), or any electric vehicle having a battery pack to be charged, such as plug-in hybrid electric vehicles (PHEVs).

The technology can be used with fully-manual control vehicles, and semi-autonomous- or fully-autonomous-driving-capable vehicles.

Use of the systems and methods described herein reduce user inconvenience associated with operating their electric vehicle. They also reduce related range anxiety that users may otherwise feel, leading to greater adoption, use, and user enjoyment of electric vehicles.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. An electric-vehicle power management system comprising:
    a processing hardware unit;
    a calendar module configured to, by way of the processing hardware unit, obtain a user itinerary indicating multiple appointment locations to be visited by a user of an electric vehicle and associated times to visit the appointment locations;
    a routing module configured to, by way of the processing hardware unit, determine optional routes connecting the appointment locations indicated by the user itinerary; and
    a vehicle-energy module configured to, by way of the processing hardware unit, predict states of charge, or changes in state of charge, for the electric vehicle in connection with the optional routes, yielding state-of-charge predictions;
    wherein the routing module determines selected routing, of the optional routes, based on the state-of-charge predictions from the vehicle-energy module; and
    wherein determining the selected routing comprises consideration of at least one factor selected from a group consisting of:
        expected weather conditions when the electric vehicle will be charging between an origin and a destination of the routing and how the weather conditions will affect the charging;
        an established user setting controlling whether a faster or more-environmentally friendly route is preferred;
        a vehicle setting controlling whether a faster or more-environmentally friendly route is preferred;
        whether an optional vehicle function is expected to be used when the electric vehicle will be charging between an origin and a destination of the routing and how the optional vehicle function will affect the charging; and
        a charging-function-related characteristic of the power station.

2. The system of claim 1, wherein:
    the selected routing leads to or includes in a routing path at least one power station at which the electric vehicle can be charged and/or discharged;
    the system further comprises a plug-in-charger module configured to, by way of the processing hardware unit:
        predict, based on an amount of time that the electric vehicle is expected to be at the power station, based on the itinerary, an amount of charging at the electric vehicle from power station; and
        determine, based on the amount of time that the electric vehicle is expected to be at the power station, based on the itinerary, whether an opportunity exists to discharge power from the electric vehicle to the power station.

3. The system of claim 2, wherein predicting the amount of charging at the electric vehicle from power station involves considering a charge fee associated with charging at the power station during a period in which the electric vehicle is expected to be plugged in to the power station.

4. The system of claim 2, wherein determining whether the opportunity exists to discharge power from the electric vehicle to the power station involves considering at least one factor selected from a group consisting of:
    whether the power station is configured to receive power from plugged-in vehicles; and
    a discharge credit associated with discharging at the power station during a period in which the electric vehicle is expected to be plugged in to the power station.

5. The system of claim 1, wherein determining the selected routing comprises determining a potential travel segment to be traversed using a mode other than the vehicle.

6. The system of claim 5, wherein determining the selected routing comprises obtaining user approval for using the mode other than the electric vehicle for traversing the potential travel segment.

7. The system of claim 1, wherein the vehicle-energy module is configured to, by way of the processing hardware unit, determine whether the electric vehicle will have sufficient state of charge for traversing the routing.

8. The system of claim 7, wherein:
the vehicle-energy module is configured to, by way of the processing hardware unit, predict a cumulative change in state of charge for the electric vehicle over a period of time during which the selected routing would be traversed; and
determining whether the electric vehicle will have sufficient state of charge comprises comparing the cumulative change in state of charge to maximum change in state of charge possible for the electric vehicle.

9. The system of claim 7, wherein the routing module is configured to, by way of the processing hardware unit, determine alternative routing in response to the vehicle-energy module determining that the electric vehicle would not have sufficient state of charge while traversing the routes.

10. The system of claim 9, wherein determining the alternative routing comprising determining a potential travel segment to be traversed using a mode of travel other than the vehicle.

11. The system of claim 10, wherein at least one module of the system is configured to, by way of the processing hardware unit, initiate, based on a time at which the user is expected to need to use the mode of travel, reservation for the user to use the mode of travel.

12. The system of claim 10, wherein determining the alternative routing comprises obtaining user approval for using the mode other than the electric vehicle for traversing the potential travel segment.

13. The system of claim 1, wherein the calendar module is configured to, by way of the processing hardware unit, determine whether calendar entries for the user itinerary are parsable and, if any entry is not parsable, perform at least one function selected from a group consisting of:
access context data to identify data that can be used to render the entry parsable;
access context data to obtain data that can be used to render the entry parsable; and
initiate communication with the user to obtain data that can be used to render the entry parsable.

14. The system of claim 1, wherein:
the selected routing is an initially selected routing;
the calendar module is configured to, by way of the processing hardware unit, after the user has begun traversing the initially selected routing, determine that there is a deviation from the user itinerary or interruption in the selected routing; and
the routing module and the vehicle-energy module are configured to, by way of the processing hardware unit, in response to the deviation or interruption, determine satisfactory alternative routing.

15. The system of claim 1, wherein:
the selected routing leads to or includes in a routing path at least one power station at which the electric vehicle can be charged and/or discharged; and
at least one module of the system is configured to, by way of the processing hardware unit, initiate reservation, based on a time at which the electric vehicle is expected to be at the power station, of a plug-in time slot at the power station.

16. An electric-vehicle power management system comprising:
a processing hardware unit;
a calendar module configured to, by way of the processing hardware unit, obtain a user itinerary indicating multiple appointment locations to be visited by a user of an electric vehicle and associated times to visit the appointment locations;
a routing module configured to, by way of the processing hardware unit, determine optional routes connecting the appointment locations indicated by the user itinerary; and
a vehicle-energy module configured to, by way of the processing hardware unit, predict states of charge, or changes in state of charge, for the electric vehicle in connection with the optional routes, yielding state-of-charge predictions;
wherein:
the routing module determines selected routing, of the optional routes, based on the state-of-charge predictions from the vehicle-energy module;
the selected routing leads to or includes in a routing path at least one power station at which the electric vehicle can be discharged;
the system further comprises a plug-in-charger module configured to, by way of the processing hardware unit determine, based on the amount of time that the electric vehicle is expected to be at the power station, based on the itinerary, whether an opportunity exists to discharge power from the electric vehicle to the power station; and
determining whether the opportunity exists to discharge power from the electric vehicle to the power station involves considering at least one factor selected from a group consisting of:
whether the power station is configured to receive power from plugged-in vehicles; and
a discharge credit associated with discharging at the power station during a period in which the electric vehicle is expected to be plugged in to the power station.

17. An electric-vehicle power management system comprising:
a processing hardware unit;
a calendar module configured to, by way of the processing hardware unit, obtain a user itinerary indicating multiple appointment locations to be visited by a user of an electric vehicle and associated times to visit the appointment locations;
a routing module configured to, by way of the processing hardware unit, determine optional routes connecting the appointment locations indicated by the user itinerary; and
a vehicle-energy module on figured to, by way of the processing hardware unit, predict states of charge, or changes in state of charge, for the electric vehicle in connection with the optional routes, yielding state-of-charge predictions;
wherein the routing module determines selected routing, of the optional routes, based on the state-of-charge predictions from the vehicle-energy module; and
wherein determining the selected routing comprises determining a potential travel segment to be traversed using a mode other than the vehicle.

18. The system of claim 17, wherein determining the selected routing comprises obtaining user approval for using the mode other than the electric vehicle for traversing the potential travel segment.

19. The system of claim 17, wherein at least one module of the system is configured to, by way of the processing hardware unit, initiate, based on a time at which the user is expected to need to use the mode of travel, reservation for the user to use the mode of travel.

\* \* \* \* \*